United States Patent [19]
McDade et al.

[11] Patent Number: 5,207,178
[45] Date of Patent: May 4, 1993

[54] ELECTRODE DEVICE FOR AN ELECTRIC SHOCK GENERATOR CARRIED ON AN ANIMAL COLLAR

[75] Inventors: Robert McDade; Steven Pancheri, both of Downingtown; Vincent A. Juliana, Chester Springs, all of Pa.

[73] Assignee: Invisible Fence Company, Inc., Berwyn, Pa.

[21] Appl. No.: 830,401

[22] Filed: Jan. 31, 1992

[51] Int. Cl.$^5$ .................. A01K 15/00; G08B 23/00
[52] U.S. Cl. ................................ 119/29; 119/106; 340/573
[58] Field of Search ................ 119/29, 106, 108; 340/573; 174/138 R, 139

[56] References Cited

U.S. PATENT DOCUMENTS

| | | |
|---|---|---|
| 2,023,950 | 12/1935 | Carter . |
| 2,741,224 | 4/1956 | Putnam . |
| 2,800,104 | 7/1957 | Cameron . |
| 2,808,030 | 10/1957 | Costanzo ........................ 119/106 |
| 2,996,043 | 8/1961 | Pettingill . |
| 3,589,337 | 10/1969 | Doss . |
| 3,608,524 | 9/1971 | Waltz ............................ 119/29 |
| 3,753,421 | 8/1973 | Peck . |
| 3,980,051 | 9/1976 | Fury . |
| 4,202,293 | 5/1980 | Gonda . |
| 4,745,882 | 5/1988 | Yarnall, Sr. . |
| 4,919,082 | 4/1990 | Tsai ............................. 119/106 |
| 5,099,797 | 3/1992 | Gonda ........................... 119/29 |

FOREIGN PATENT DOCUMENTS 2455843 11/1980 France .

OTHER PUBLICATIONS

Technical Bulletin No. 002.
Technical Bulletin No. 024.
Technical Bulletin No. 025.

*Primary Examiner*—John G. Weiss
*Attorney, Agent, or Firm*—Dann, Dorfman, Herrell and Skillman

[57] ABSTRACT

An electrode device is provided for use with an electric shock generator carried on the collar of an animal. The electric shock generator produces an electric shock for output to the animal under predetermined conditions to control the movement of the animal. The electrode device includes a snap-on electrically insulative electrode casing which is removably mountable on the animal collar remote from the shock generator. The electrode casing mounts on the animal collar in a manner which permits the electrode casing to freely glide along the animal collar. An electrode is supported on the electrode casing in position to engage the animal in order to transmit the electrical shock produced by the electric shock generator to the animal under the predetermined conditions. A flexible electrical connector electrically connects the shock generator with the electrode. The flexible connector has a flexible wireless conductive path on a flexible insulator. The flexible connector has sufficient length and flexibility to permit movement of the connector without breaking the conductive path during movement of the animal.

50 Claims, 3 Drawing Sheets

ELECTRODE DEVICE FOR AN ELECTRIC SHOCK GENERATOR CARRIED ON AN ANIMAL COLLAR

FIELD OF THE INVENTION

The present invention relates to an animal collar arrangement of the type having an electric shock generator carried on an animal collar for administering an electrical shock to the animal under predetermined conditions to control the movement of the animal and, more particularly, to an electrode device having an electrode supported on the animal collar remote from the electrical shock generator for administering the electrical shock produced by the shock generator to the animal.

BACKGROUND OF THE INVENTION

A frequent problem attendant with pet ownership is the confinement of an unsupervised pet to a designated area such as the pet owner's yard. Without proper confinement, a pet may run free, thereby creating not only the potential for damaging neighboring property, but also the potential for endangering the animal itself.

While some pet owners have resorted to fences and other physical barriers to confine the animal, financial considerations often make physical barriers unacceptable. Depending on the type of fence selected, the cost of fence erection can frequently become cost prohibitive to some pet owners. Another problem is that fences and other physical barriers may be undesirable for aesthetic reasons. Often times a relatively inexpensive fence is not only ineffective at animal containment but is unsightly as well.

As an alternative to the use of fences or other physical barriers for pet confinement, electronic animal confinement systems are now being used. With a conventional electronic animal confinement system, a signal transmitter is connected to a wire loop antenna having sufficient length to surround a selected area in which a pet is to be confined, such as the pet owner's yard. The wire loop antenna may be laid directly on top of the ground or the antenna may be buried slightly below the surface of the ground. A relatively low frequency signal, typically in a sub-broadcast range of frequencies, is transmitted over the wire loop antenna.

In order to confine the animal within the designated area enclosed by the wire loop antenna, a signal receiver is attached to a collar on the animal. The signal receiver incorporates an electric shock generator which produces an electrical shock for transmission to the animal under predetermined conditions. Typically, when the animal moves within a selected distance of the wire loop antenna, the signal receiver on the animal collar responds to the signal being transmitted over the wire loop antenna and causes the electric shock generator to administer an electric shock to the animal. The electric shock produced by the electric shock generator is transmitted to the animal by a pair of electrodes affixed to the signal receiver in position to engage the animal.

For the purpose of restraining an animal that ignores the electric shock produced by the electrodes mounted on the signal receiver, remote electrodes have been affixed to the animal's collar to supplement the electrodes mounted on the signal receiver. A remote electrode is affixed onto the animal collar at a remote position from the signal receiver. A conductive wire is typically used to connect the remote electrode to a corresponding electrode on the signal receiver. A drawback with this type of conventional remote electrode arrangement is that the conductive wire used to interconnect the remote electrode with the electrode on the signal receiver exhibits a tendency to break, thereby disconnecting the remote electrode. An additional problem is that the remote electrodes affixed to the animal collar have a tendency to work free and fall out of the collar over time.

In an attempt to alleviate some of the problems with the conventional remote electrode arrangement, a steel insert plate has been employed to interconnect the remote electrode secured to the collar with a corresponding electrode on the signal receiver. Unfortunately, the steel inserts have not always been satisfactory either. The rigidity of the steel insert creates a tendency for inadvertent breakage caused by the back and forth bending of the steel insert during use. Steel inserts are particularly susceptible to problems when used with a relatively flexible collar.

In accordance with the present invention, a unique animal collar arrangement is provided in which remote electrodes are connected with corresponding electrodes on a signal receiver by a unique flexible wireless conductor. In addition, the remote electrodes are mounted on electrode casings which freely glide along the animal collar to reduce unnecessary stresses on the remote electrodes and the flexible connectors.

SUMMARY OF THE INVENTION

In accordance with the present invention, an electrode device is provided for use with an electric shock generator of the type carried on the collar of an animal for administering an electrical shock to the animal under predetermined conditions. The electric shock generator is incorporated within a signal receiver having at least one output terminal for outputting the electrical shock to the animal under the predetermined conditions in order to control the movement of the animal.

The electrode device in accordance with the present invention includes an electrically insulative electrode casing removably mountable on the animal collar remotely away from the electric shock generator. A slide is provided for mounting the electrode casing on the collar in order to permit the electrode casing to slidably move along the collar. The slide on the insulative electrode casing enables the electrode casing to freely glide along the animal collar.

The electrode device also includes a remote electrode supported on the electrode casing in position to engage the animal in order to transmit the electric shock produced at the output terminal of the shock generator to the animal under the predetermined conditions. The electrode is movable with the electrode casing on the collar.

The electrode device also includes a flexible electrical connector for electrically connecting the output terminal of the shock generator with the remote electrode. The electrical connector provides an electrically conductive path between the output terminal of the shock generator and the remote electrode so that the electrical shock produced at the output terminal of the shock generator can be passed through the conductive path of the electrical conductor to the remote electrode for transmission to the animal under the predetermined conditions. The flexible electrical connector functions to maintain electrical connection between the output terminal of shock generator and the remote electrode even during slidable movement of the electrode casing on the collar.

Preferably, the flexible connector is in the form of a flexible connecting strip having a generally flat flexible wireless conductive path on a generally flat flexible insulator. The wireless conductive path may include a trace of conductive material provided on the generally flat flexible insulator. The flexible connector is of sufficient length and flexibility to permit repeated movement of the connector during movement of the animal without breaking the conductive path. The use of a flexible connecting strip functions to inhibit breakage of the electrical connection between the remote electrode and the output terminal on the electric shock generator. When the flexible connecting strip is used in conjunction with a remote electrode that freely glides along the animal collar, a durable remote electrode device is provided.

BRIEF DESCRIPTION OF THE DRAWINGS

The foregoing summary, as well as the following detailed description of the preferred embodiments of the present invention, will be better understood when read in conjunction with the accompanying drawings in which.

DETAILED DESCRIPTION OF THE PREFERRED EMBODIMENTS

Figure 1:
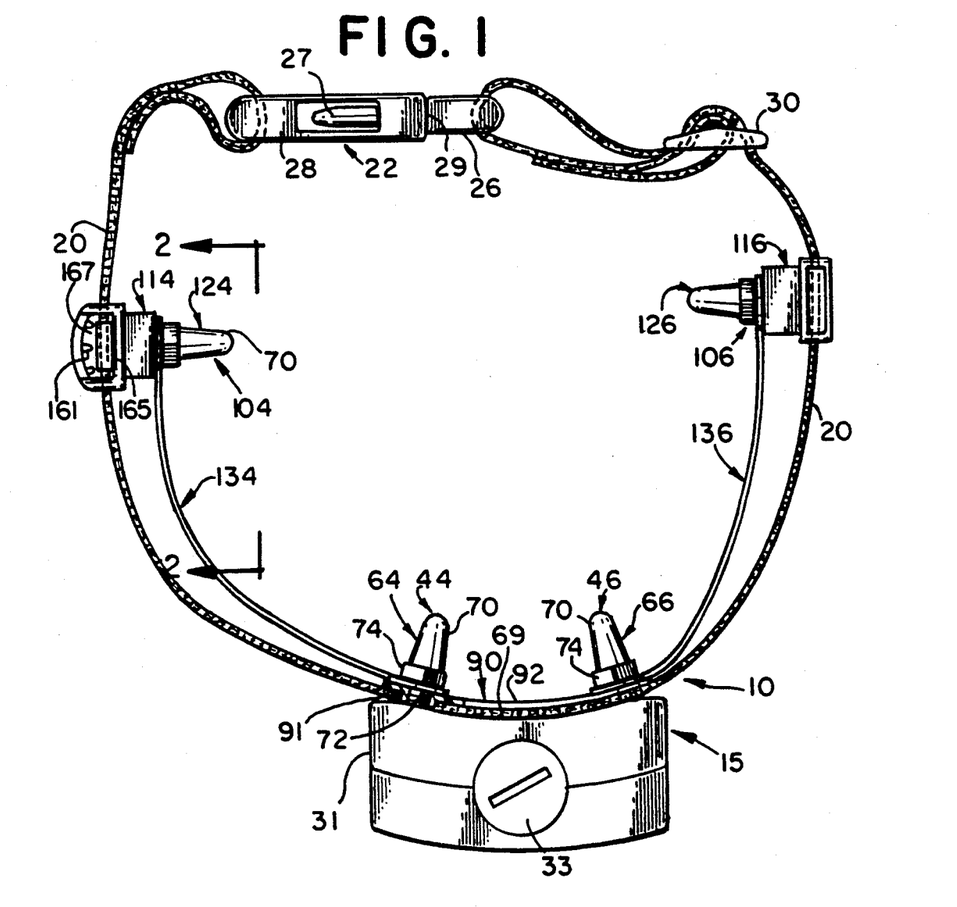
FIG. 1 is a top plan view of an animal collar arrangement in which a signal receiver incorporating an electric shock generator is mounted onto an animal collar by terminal electrodes attached to the signal receiver, the terminal electrodes being electrically connected to remote electrode devices in accordance with the present invention, a small portion of the collar being broken away at one of the terminal electrodes.

Referring to the drawings, and initially to FIG. 1, an animal collar arrangement generally designated 10, is depicted. The animal collar arrangement is employed as part of an electronic animal confinement system. During use, the animal collar arrangement 10 is secured around an animal's neck so that an electric shock can be administered to the animal under predetermined conditions in order to control the movement of the animal.

As part of the electronic animal confinement system, a conventional signal transmitter (not shown) having a conventional wire loop antenna (not shown) is employed. The wire loop antenna is positioned at a designated area in which an animal is to be confined or restrained. When used with an outdoor system, the wire loop antenna may be placed upon the ground or may be buried slightly below the ground along the outer periphery of a desired confinement area such as the pet owner's yard. In addition to animal confinement, the wire loop antenna may also be placed at a desired location to restrain the entry of the animal. For example, the antenna may be used around a swimming pool in order to restrain the animal from entering the swimming pool area. For an indoor system, the wire loop antenna may be used to surround a selected confinement area such as a room. The indoor antenna may also be placed at a desired location in a particular room such as on or under a piece of furniture to deter the animal from approaching the selected piece of furniture.

When the electronic animal confinement system is activated, the transmitter produces a low frequency signal, such as approximately 10.75 Khz, in a sub-broadcast band of frequencies, over the wire loop antenna. The transmitter may be of the type, for example, which has been sold by Invisible Fence Company, Inc. of Berwyn, Pennsylvania under Model No. CT-4000 when used with an outdoor system, or under Model No. AT-880 when used with an indoor system.

In operation, the animal collar arrangement 10 worn by the animal responds to the transmitted signal in the wire loop antenna whenever the animal moves within a selected distance from the wire loop antenna. Within the selected distance, the animal collar arrangement 10 responds to the transmitted signal and functions to administer a slight electric shock to the animal to deter further movement of the animal toward the antenna.

In order to generate the electric shock, the animal collar arrangement 10 includes an electric shock generating signal receiver unit 15 which is responsive to the transmitted signal in the wire loop antenna. In response to the transmitted signal in the wire loop antenna, the shock generating signal receiver unit 15 produces an electric shock to the animal in order to control movement of the animal toward the wire loop antenna. The shock generating signal receiver unit 15 may be of the general type sold by Invisible Fence Company, Inc. of Berwyn, Pennsylvania, under Model No. R-6500.

The electric shock generator 15 is carried on a conventional animal collar 20 constructed of a suitable material such as nylon fabric or leather. So that the collar can be opened and closed, the collar 20 includes a conventional side release buckle 22 molded from a suitable material such as a synthetic resinous material. The buckle 22 includes a fastening insert member 26 attached to one end of the collar and a cooperating catch member 28 attached to the other end of the collar. In order to open the buckle 22, spring arms 27 are squeezed together to enable the fastening insert member 26 to be withdrawn from the cooperating catch member 28. In order to close the buckle 22, the fastening insert member 26 may be pushed into the free end 29 of the catch member 28 until the spring arms 27 spring apart to snap the buckle closed.

In order to properly fit the collar 20 around the neck of the animal, the collar includes a conventional glide element 30 in the form of a triglide constructed of a suitable material such as a molded synthetic resinous material or a die-cast zinc metal. For size adjustment, the glide element 30 may be slid along the collar to increase or decrease the length of the collar.

The electric shock generator 15 carried on the collar 20 includes an outer casing 31 constructed of a suitable synthetic resinous material such as molded glass-filled polycarbonate. The casing 31 includes a screw cap 33 for enclosing an internal battery chamber.

As shown in FIG. 1, a pair of output terminals, generally designated 44 and 46, are provided on the electric shock generator for transmitting the electric shock produced by the electric shock generator to the animal. The output terminals 44 and 46 of the electric shock generator 15 respectively include electrically-conductive output terminal electrodes 64 and 66 constructed of an electrically-conductive metal such as stainless steel. The use of stainless steel inhibits rusting of the exposed surfaces of the terminal electrodes 64 and 66 during use. In order to permit the shock generator to be removably mounted on the collar 15, the terminal electrodes 64 and 66 are insertable into and removable from the back surface 69 of the casing 31 of the electric shock generator 15.

As shown in FIG. 1, each of the electrodes 4 and 66 respectively includes an external post portion 70 having a generally frusto conical shape with a domed tip for engaging the animal to transmit the electrical shock produced by the electric shock generator to the animal. Each electrode 64 and 66 also includes a fastener portion 72 for insertion into the casing 31 of the electric shock generator 15 to retain the electrode on the shock generator in position to engage the animal. Preferably, the fastener portion 72 of each electrode includes a threaded screw-type base to permit the electrodes 64 and 66 to be screwed in and out of the casing 31 of the electric shock generator 15. Each electrode also includes an enlarged hexagonal stop portion 74 positioned longitudinally intermediate the post portion and the fastener portion 72. The enlarged hexagonal stop portion of each electrode 64 and 66 functions to limit insertion of the fastener portion 72 of the electrode into the casing 31 of the electric shock generator 15 The electric shock generator 15 is mounted on the collar 20 by screwing the electrodes 64 and 66 into position at the back surface 69 of the casing through aligned collar holes 85 in the collar 20.

For the dual purposes of reinforcing the collar holes 85 and insulating the electrodes 64 and 66 from the collar, an electrically insulative back strip member 90 is employed. The back strip member 90 is molded as a single piece unit from a suitable electrically-insulative material such as a synthetic resinous material like polypropylene. The back strip member 90 includes an annular-shaped boss 91 for positioning at each output terminal of the electric shock generator. The annular bosses 91 are mounted on a generally flexible elongated support strip 92. The bosses 91 project from the support strip 92 to serve as grommets for respectively reinforcing and insulating the collar holes 85. The bosses 91 are dimensioned to loosely fit within the collar holes 85 to separate the collar from the fastener portions 72 of the electrodes 64 and 66 which are inserted through the collar holes 85 when the electrodes are screwed into the back surface 69 of the casing 31.

For any particular animal, the shock administered by the terminal electrodes 64 and 66 mounted on the shock generator 15 may not be sufficient to deter the animal from closer approach to the wire loop antenna of the transmitter. As a further deterrent to this type of animal, remote electrode devices, generally designed 104 and 106, are mounted on the animal collar 20, as shown in FIG. 1. Each of the electrode devices 104 and 106 respectively includes an electrically insulative electrode casing 114 and 116 removably mountable on the collar 20 at respective locations remotely spaced from the shock generator 15.

Figure 3:
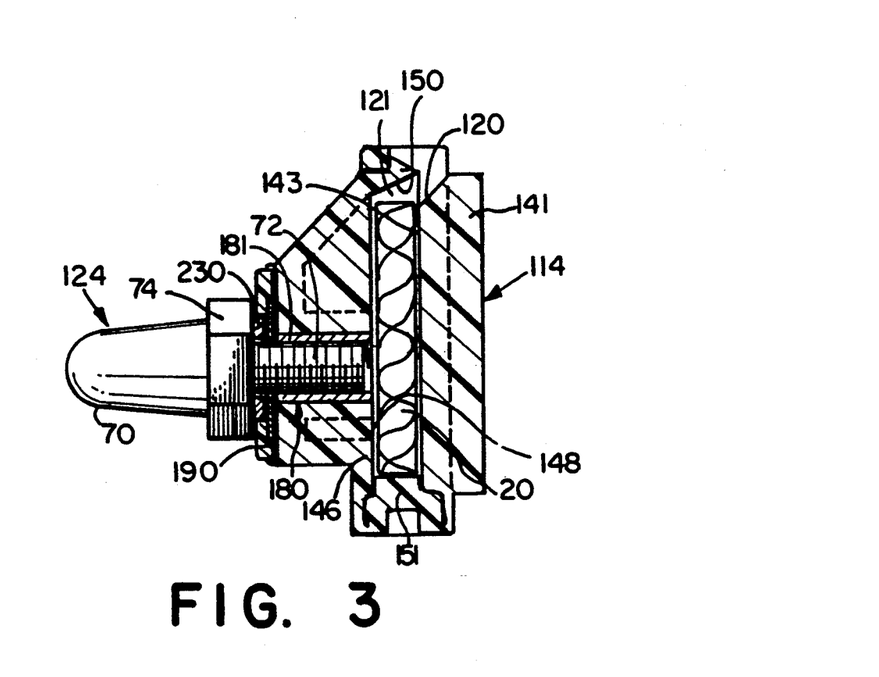
FIG. 3 is a cross-sectional view of the insulative electrode casing taken along line 3—3 of FIG. 2 to show the remote electrode supported on the insulative electrode casing carried on the animal collar.

Both of the electrode casings 114 and 116 are generally uniform in construction. Each of the electrode casings 114 and 116 includes a slide portion 120 for mounting the electrode casing on the collar in a manner which permits the electrode casing to slidably move along the collar. As best shown in FIG. 3, the slide portion 120 of the electrode casing 114 includes a passageway 121 through the electrode casing for receiving the collar so that the electrode casing 114 may freely glide along the collar 20 as the collar 20 passes through the passageway 121.

In order to administer an electrical shock to the animal at locations remote from the electric shock generator, remote electrodes 124 and 126 are respectively supported on the electrode casings 114 and 116. The remote electrodes 124 and 126 are positioned on the collar 20 to engage the animal when the collar 20 is attached to the animal. The remote electrodes 124 and 126 function to transmit the electrical shock produced at the output terminals 44 and 46 of the electric shock generator to the animal under the predetermined conditions. Mounting the remote electrodes 124 and 126 onto the respective electrode casings 114 and 116 enables the remote electrodes 124 and 126 to be movable with the electrode casings 114 and 116 on the collar 20.

So that the electrical shock can be generated at the remote electrodes 124 and 126, flexible electrical connectors 134 and 136 are respectively connected between the respective remote electrodes 124 and 126 and the respective terminal electrodes 64 and 66. The flexible electrical connectors 134 and 136 respectively provide electrically conductive paths 137 between the respective output terminals 44 and 46 of the electric shock generator 15 and the respective remote electrodes 124 and 126 so that the electrical shock produced at the respective output terminals 44 and 46 of the shock generator may be passed through the conductive paths 137 of the respective electrical connectors 134 and 136 to the respective remote electrodes 124 and 126 for transmission to the animal under the predetermined conditions. The respective flexible electrical connectors 134 and 136 function to maintain good electrical connection between the respective output terminals 44 and 46 of the electric shock generator 15 and the respective remote electrodes 124 and 126 during slidable movement of the respective electrode casings 114 and 116 along the collar.

The remote electrodes 124 and 126 are generally uniform with respect to one another and with respect to the terminal electrodes 64 and 66. Each of the remote electrodes 124 and 126 is constructed of a stainless steel material to inhibit rusting. Each of the remote electrodes 124 and 126 includes an outer post portion 70 for engaging the animal when the collar is attached to the animal in order to transmit the electrical shock produced by the shock generator 15 to the animal. As best shown in FIG. 3, the remote electrode 124 includes a fastener portion 72 for insertion into the electrode casing 114 to retain the electrode in position on the electrode casing. Preferably, the fastener portion of the remote electrode 24 includes a threaded screw-type base to permit the remote electrode 124 to be screwed in and out of the electrode casing 114. The remote electrode 124 also includes an enlarged hexagonal stop portion 74 positioned longitudinally intermediate the post portion 70 and the fastener portion 72 of the electrode. The enlarged hexagonal stop portion 74 of the remote electrode 124 functions to limit insertion of the remote electrode 124 into the electrode casing 114.

The electrode casing 114 is molded from a suitable material such as a synthetic resinous material like polypropylene. As best shown in FIG. 3, the electrode casing is molded so that the collar 20 may be loosely enclosed within the internal passageway 121 through the electrode casing when the electrode casing is mounted on the collar. The electrode casing 114 includes first and second side members 141 and 146 which respectively provide first and second side walls 143 and 148 for positioning on opposite sides of the collar 20 generally parallel to one another When the electrode casing is closed about the collar 20. The electrode casing 114 also includes first and second edge members 150 and 151 for positioning on opposite edges of the collar when the electrode casing 114 is closed about the collar. As shown in FIG. 3, the first and second edge members and the first and second side walls function to provide the internal passageway 121 for the collar through the electrode casing when the electrode casing is closed about the collar thereby providing the slide portion 120 of the electrode casing to permit the electrode casing to freely glide along the collar.

Figure 4:
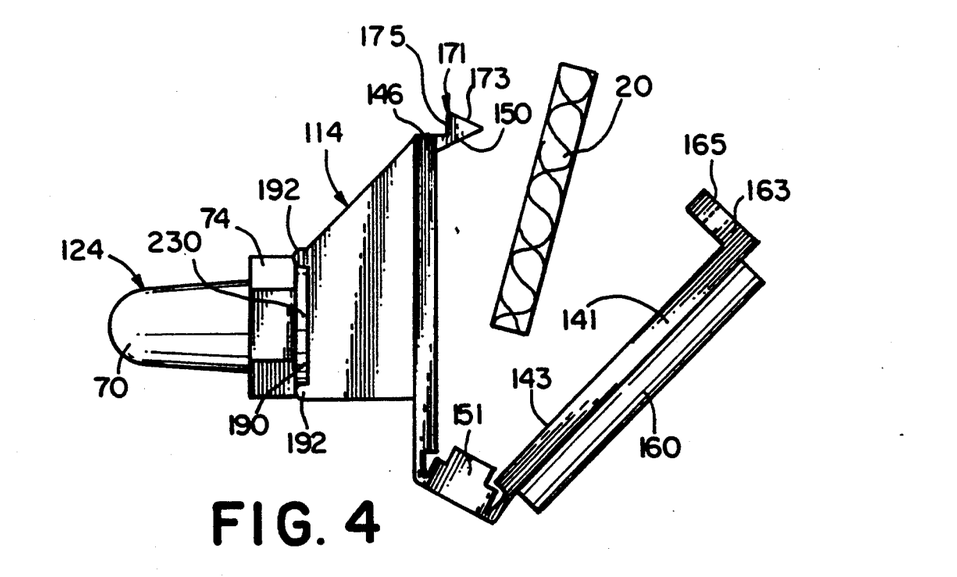
FIG. 4 is a side elevational view of the remote electrode supported on the insulative electrode casing in accordance with the present invention showing the electrode casing in an open position to permit mounting onto the animal collar shown in cross-section.

As best shown in FIG. 4, the first edge member 150 projects at an angle from a free end of the second side member 146. The other end of the second side member 146 is hinged to the second edge member 151. Likewise, one end of the first side member 141 is hinged to the second edge member 151. The hinged connections between the second edge member 151 and the respective side members 141 and 146 are provided by molding appropriate conforming shapes in the second edge member 151 and the connected hinged ends of the first and second side members 141 and 146 to permit the side members 141 and 146 to be rotated toward one another about the second edge member 151 without buckling the hinged connections.

The first side member 141 is molded to have a smooth rounded outer surface 160, as best shown in FIG. 4, with internal support ribs 161, as best shown in FIG. 1, extending longitudinally along a generally hollow interior of the rounded outer surface 160. A strike member 163 projects from a free end of the first side member 141 distal to the hinged connection of the first side member to the second edge member 151. The strike member 163 includes a latch stop 165 in the form of a latch bar which extends across the width of the electrode casing, as best shown in FIG. 1. The strike member 163 also includes a release opening 167 positioned proximate to the latch stop 165. The release opening 167 provides access externally from the electrode casing to permit the electrode casing to be unlatched for the purpose of opening the electrode casing about the collar 20.

The first edge member 150 projecting from the free end of the second side member 146 provides a snap-action closure member for closing against the strike member 16 of the electrode casing to latch the electrode casing closed. The closure member is in the form of a latching tongue 171 having a cam surface 173 and a stop shoulder 175 oriented at an angle relative to the cam surface 173. The cam surface 173 is positioned on the latching tongue 171 to slidably engage the latch stop 165 as the electrode casing is squeezed closed. The cam surface 173 slides along the interior surface of the latch stop 165 against the resiliency of the latching tongue 171 until the stop shoulder 175 of the latching tongue 173 moves into engagement with the latch stop 165 whereupon the resiliency of the latching tongue causes the stop shoulder 175 to snap into engagement with the latch stop 165 thereby latching the first edge member 150 to the latch stop and enclosing the collar 20 within the passageway 121 as shown in FIG. 3.

In operation, the first side member 141 is movable relative to the first edge member 150 along a path of movement permitting the first side member to releasably latch to the first edge member to enclose the collar 20 within the passageway 121. When the electrode casing 114 is snapped closed about the collar 20, the release opening 167 in the strike member 163 provides access to the latching tongue 171 externally from the electrode casing to permit the latching tongue 171 to be released from the latch stop 165 to open the electrode casing to permit removal of the collar from the passageway 121 in the electrode casing.

Figure 2:
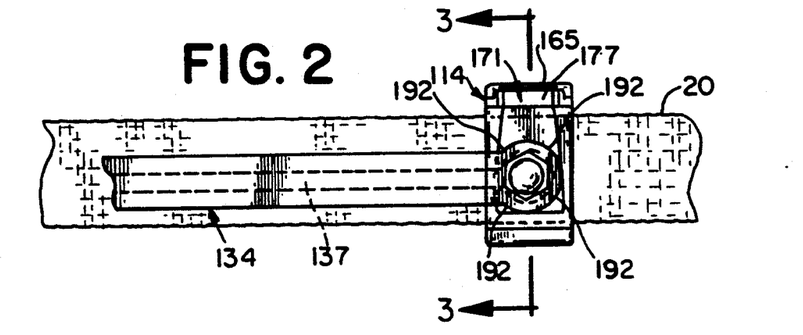
FIG. 2 is a sectional view of the animal collar arrangement taken along line 2—2 of FIG. 1 to show a remote electrode supported on an insulative electrode casing carried on the animal collar.

The latching tongue 171 may also be released from the latch stop 165 by the insertion of a tool into a release slot 177 provided in the stop shoulder 175 of the latching tongue, as best shown in FIG. 2. The use of a tool in the release slot 177 to move the stop shoulder 175 of the latching tongue 171 out of latched engagement with the latch stop 165 releases the latching tongue 171 from the latch stop 165 to open the electrode casing to permit removal of the collar from the internal passageway 121.

In order to permit the remote electrode 124 to be mounted onto the electrode casing 114, an electrode receptacle 180 is provided on the electrode casing to hold the electrode 124 in position on the electrode casing. As best shown in FIG. 3, the electrode receptacle 180 includes a metallic socket 181 with a threaded inner surface affixed within a bore in the second side member 146. The remote electrode 124 is insertable into and removable from the electrode receptacle 80. For this purpose, the threaded fastener portion 72 of the remote electrode 124 may be screwed in and out of the socket 181 of the receptacle 180. The second side member 146 also includes an external mounting surface 190 for receiving the flexible connector 134 at the electrode receptacle 180. The mounting surface 190 includes tangs 192 in the form of small projections at the periphery of the mounting surface 190, as best shown in FIGS. 2 and 4.

The flexible electrical connectors 134 and 136 for electrically connecting the remote electrodes 124 and 126 to the respective output terminals 44 and 46 of the electric shock generator, are in the form of generally flat, flexible strips. Both of the electrical connectors 134 and 136 are substantially uniform in construction. Each of the flexible strip-like connectors 134 and 136 includes a flexible insulator portion 200. The conductive path 137 on the flexible connectors 134 and 136 is in the form of a flexible wireless conductive path. Each of the flexible connectors 134 and 136 has sufficient length and flexibility to permit repetitive and continuing movement without breaking the conductive path 137 during movement of the animal.

Figure 5:
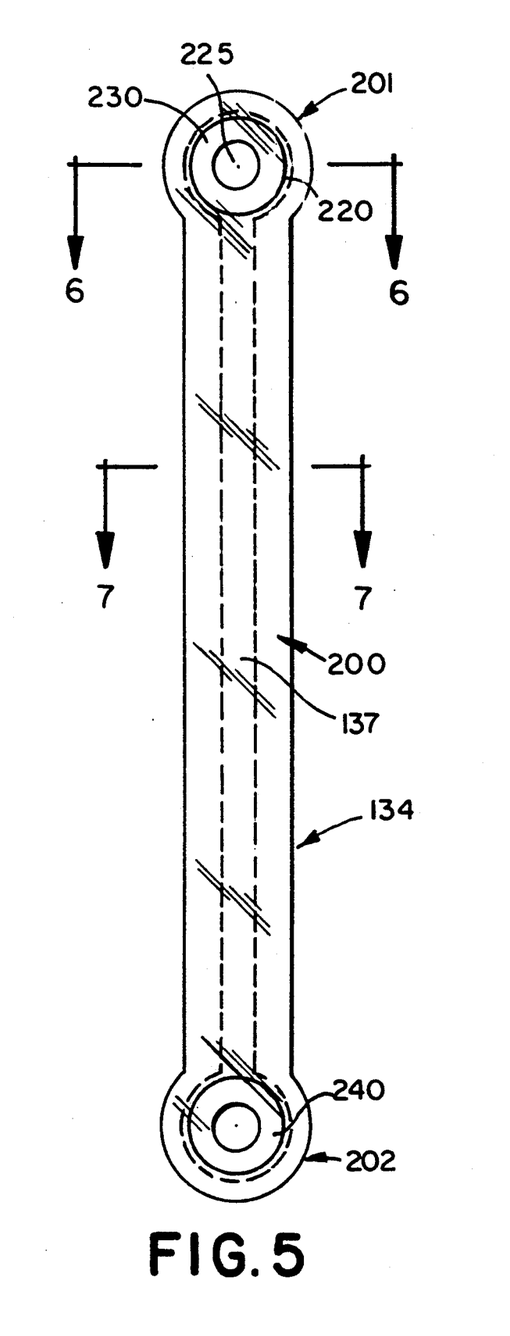
FIG. 5 is a plan view of a flexible electrical connector and accompanying washers for electrically connecting the remote electrode of the type shown in FIG. 3 with one of the terminal electrodes attached to the signal receiver.

As shown in FIG. 5, the flexible connector 134 includes a first connecting pad 201 disposed at one end of the flexible connector for electrical connection to the remote electrode 124 at the electrode receptacle 180 on the electrode casing 114. The flexible connector 134 also includes a second connecting pad 202 disposed at the other end of the flexible connector for electrical connection to the output terminal 44 of the electric shock generator 15.

Figure 7:
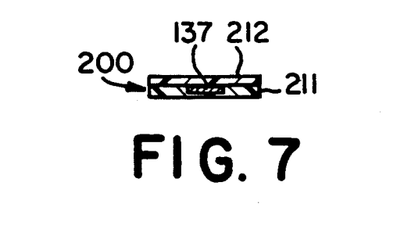
FIG. 7 is a cross-sectional view of the flexible electrical connector taken along line 7—7 of FIG. 5.

As best shown in FIG. 7, the flexible insulator 200 of the flexible connector 134 includes a first generally flat insulative layer 211 made from a suitable insulative material such as a synthetic resinous material like polycarbonate. The wireless conductive path 137 is provided on the first insulative layer 211 as a generally flat conductive trace or film of conductive material, such as silver, deposited on the first insulative layer. The flexible insulator 200 also includes a generally flat second insulative layer 212 of a suitable material such as a synthetic resinous material like polyester. The second insulative layer 212 is laminated to the first insulative layer 211 over the conductive trace 137. The first and second insulative layers 211 and 212 are laminated together so that the conductive trace 137 is sealed between the two insulative layers 211 and 212. The insulative layers 211 and 212 may be sealed together using a suitable adhesive.

Figure 6:
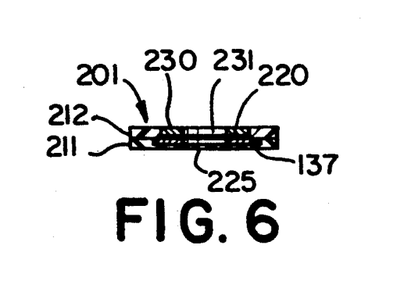
FIG. 6 is a cross-sectional view of a connecting pad of the flexible electrical connector taken along line 6—6 of FIG. 5.

Both of the connecting pads 201 and 202 have a generally uniform construction. With reference to FIG. 6, the first connecting pad 201 includes a recess 220 in the generally flat flexible insulator to expose the wireless conductive path 137 at the bottom of the recess. More specifically, the conductive path is disposed on the first insulative layer 211 and the recess 220 is provided in the second insulative layer 212 so that the conductive path 137 on the first insulative layer 211 is exposed at the bottom of the recess in the second insulative layer 212.

The connecting pad 201 also includes a central opening 225, as best shown in FIG. 5, through the bottom of the recess 220 to permit the passage of the fastener portion 72 of the remote electrode 124 therethrough. The recess 220 is dimensioned with a generally annular shape to receive an electrically conductive washer 230 in electrical contact with the wireless conductive path 137 at the bottom of the recess. As shown in FIG. 6, the conductive washer 230 is seated in the recess 220 so that the washer opening 231 is aligned with the opening 225 in the bottom of the recess to enable the fastener portion 72 of the remote electrode 124 to be inserted therethrough. A washer 240 is similarly situated within a recess in the second connecting pad, as shown in FIG. 5.

In order to mount the electrode devices 104 and 106 onto the collar 20, the respective electrode casings 114 and 116 are snapped closed around the collar 20 at respective positions remote from the electric shock generator 15. The hinged connections between the second edge member 151 and the first and second side members 141 and 146 allow the necessary movement of the electrode casing to provide a positive closure. As each of the electrode casings 114 and 116 is snapped closed, the latching tongue 171 moves into engagement with the latch stop 165 until the stop shoulder 175 of the latching tongue 171 snaps into latched engagement with the latch stop 165 thereby securing the respective electrode casing onto the collar 20.

Once the electrode casings 114 and 116 are secured onto the collar, the flexible electrical connectors 134 and 136 can be electrically connected between the respective remote electrodes 124 and 126 and the respective terminal electrodes 64 and 66 on the electric shock generator 15. With reference to electrode casing 114, the remote electrode 124 must be unscrewed from the electrode casing 114. Next, the first connecting pad 201 is pressed against the mounting surface 190 of the electrode casing 114 at the electrode receptacle 180 on the electrode casing. The tangs 192 at the mounting surface 190 of the electrode casing 114 are suitably positioned to engage the outer peripheral edges of the first connecting pad 201 to confine movement of the connecting pad at the mounting surface 190. With the recess 220 in the first connecting pad 201 being outwardly exposed, the conductive washer 230 is properly seated within the recess 220 to ensure good electrical contact between the washer 230 and the exposed conductive path 137 at the bottom of the recess 220. Next, the fastener portion 72 of the remote electrode 124 is inserted through the washer opening 231 and the opening 225 through the first connecting pad 201 and into the electrode receptacle 180. The electrode is tightened until the stop portion 74 of the remote electrode 124 makes good electrical contact with the washer 230 and the washer 230 makes good electrical contact with the conductive path 137 at the bottom of the recess 220. In tightened position, the first connecting pad 201 is securely captured and held in position on the mounting surface 190 of the electrode casing 114 between the stop portion 74 of the remote electrode 124 and the receptacle 180 at the mounting surface 190.

The terminal electrode 64 is then unscrewed from the electric shock generator 15. The second connecting pad 202 is then properly positioned to permit the fastening portion 72 of the terminal electrode 64 to be inserted through the second connecting pad and back into the back surface 69 of the electric shock generator 15. Before the terminal electrode 64 is inserted through the second connecting pad 202 and back into the shock generator 15, the electrically conductive washer 240 is seated within the recess in the second connecting pad 202 so that good electrical contact is made between the washer 240 and the conductive path 137 at the bottom of the recess in the second connecting pad. The terminal electrode 64 is then screwed back into the casing so that the stop portion 74 of the terminal electrode 64 makes good electrical contact with washer 240. Tightening of the terminal electrode 64 is continued until the electric shock generator 15 is secured in position on the collar 20 with good electrical contact between the electrode 64 and the washer 240 and between the washer 240 and the conductive path 137 at the bottom of the recess in the second connecting pad. The other electrical connector 136 is then connected in a similar manner between remote electrode 126 and terminal electrode 66.

From the foregoing description, it can be seen that the present invention provides a durable remote electrode device for administering an electrical shock to an animal. It should be recognized, however, by those skilled in the art that changes or modification may be made to the above-described embodiments without departing from the broad inventive concepts of the invention. It should be understood, therefore, that the present invention is not limited to particular embodiments disclosed herein, but is intended to cover all modifications and changes which are within the scope and spirit of the appended claims.

What is claimed is:

1. An electrode device for use with an electric shock generator carried on a collar of an animal, the electric shock generator having at least one output terminal for producing an electrical shock for output to the animal under predetermined conditions to control movement of the animal, said electrode device comprising:
   A. an electrically insulative electrode casing removably mountable on the collar remote from the shock generator, the electrode casing having a slide for mounting the electrode casing on the collar to permit the electrode casing to slidably move along the collar;
   B. an electrode supported on the electrode casing in position to engage the animal to transmit the electrical shock produced at the output terminal of the shock generator to said animal under said predetermined conditions, the electrode being moveable with the electrode casing on the collar; and
   C. a flexible electrical connector for electrically connecting the output terminal of the shock generator with said electrode, the electrical connector providing an electrically conductive path between the output terminal of the shock generator and the electrode so that the electrical shock produced at the output terminal of the shock generator is passed through the conductive path of the electrical connector to the electrode for transmission to the animal under the predetermined conditions, said flexible electrical connector maintaining electrical connection between the output terminal of the shock generator and the electrode during slidable movement of the electrode casing on the collar.

2. The device in accordance with claim 1 wherein said slide includes a passageway through the electrode casing for receiving the collar and said electrode casing includes a snap-action closure member for opening and closing the electrode casing about the collar in the passageway.

3. The electrode device in accordance with claim 2 wherein the closure member closes against a strike member on the electrode casing and wherein one of the closure member and the strike member includes a latching tongue and the other of said closure member and said strike member includes a latch stop, the latching tongue having a cam surface and a stop shoulder oriented at an angle relative to the cam surface, the cam surface being positioned on the latching tongue to slidably engage the latch stop until the stop shoulder on the latching tongue moves into engagement with the latch stop and snaps into engagement with the latch stop thereby latching the closure member.

4. The electrode device in accordance with claim I wherein the electrode casing includes first and second side members providing first and second side walls for positioning on opposite sides of the collar and first and second edge members for positioning on opposite edges of the collar, the respective first and second edge members and the first and second side walls being oriented relative to one another to provide a passageway through the electrode casing for the collar, and wherein said slide includes said passageway for said collar.

5. The electrode device in accordance with claim 4 wherein the first side member is moveable relative to the first edge member along a path of movement permitting the first side member to releasably latch to the first edge member to enclose the collar within the passageway.

6. The electrode device in accordance with claim 5 wherein one of said first side member and said first edge member includes a latching tongue and the other of said first side member and said first edge member includes a latch stop, said latching tongue being engageable with the latch stop to latch the first side member and the first edge member together to enclose the collar within the passageway.

7. The electrode device in accordance with claim 6 wherein said latching tongue includes a cam surface and a stop shoulder oriented at an angle relative to the cam surface, the cam surface being positioned on the latching tongue to move into engagement with the latch stop until the stop shoulder on the latching tongue moves into engagement with the latch stop and snaps into latched engagement with the latch stop.

8. The electrode device in accordance with claim 7 wherein said latching tongue includes a release slot to enable the insertion of a tool to move the stop shoulder out of latched engagement with the latch stop to release the latching tongue from the latch stop to permit removal of the collar from the passageway.

9. The electrode device in accordance with claim 7 wherein said first edge member includes a release opening providing access to the latching tongue externally from the electrode casing to permit the latching tongue to be released from the latch stop to permit removal of the collar from the passageway.

10. The electrode device in accordance with claim 1 wherein said electrode casing includes an electrode receptacle for holding the electrode in position on the electrode casing.

11. The electrode device in accordance with claim 10 wherein said flexible connector includes at least one connecting pad and said electrode casing includes a mounting surface at the receptacle for holding the connecting pad of the flexible connector in position on the electrode casing to facilitate electrical connection of the electrically conductive path with the electrode at the receptacle.

12. The electrode device in accordance with claim 11 wherein said connecting pad has outer peripheral edges and said mounting surface includes tangs positioned to engage the outer peripheral edges of the connecting pad to confine movement of the connecting pad on the mounting surface.

13. The electrode device in accordance with claim 12 wherein said electrode is insertable into and removable from the receptacle and includes a post portion positioned external to the electrode casing for engaging the animal, a fastener portion for insertion into the receptacle to hold the electrode in position on the electrode casing, and a stop portion positioned intermediate the post portion and the fastener portion to limit insertion of the electrode into the electrode casing, and wherein the connecting pad is captured and held in position on the mounting surface of the electrode casing between the stop portion of the electrode and the receptacle.

14. The electrode device in accordance with claim 1 wherein the electrode is removably attachable to the electrode casing.

15. The electrode device in accordance with claim 1 wherein said flexible connector includes a flexible insulator and said conductive path includes a wireless conductor on the flexible insulator, the flexible connector having sufficient length and flexibility to permit movement of the flexible connector during movement of the animal without breaking the conductive path.

16. The electronic animal control system in accordance with claim 15 wherein said wireless conductor includes a conductive trace deposited on said flexible insulator.

17. The electronic animal control system in accordance with claim 15 wherein said flexible connector is in the form of a generally flat strip and wherein said flexible insulator is generally flat and includes a first insulative layer of resinous material and wherein said wireless conductor is generally flat and includes a conductive trace deposited on said first insulative layer.

18. The electronic animal control system in accordance with claim 17 wherein said flexible insulator includes a second insulative layer of resinous material over the conductive trace.

19. The electronic animal control system in accordance with claim 18 wherein said first layer of resinous material comprises polycarbonate and said second layer comprises polyester.

20. The electrode device in accordance with claim 1 wherein said electrode casing includes an electrode receptacle for receiving said electrode and wherein said flexible connector includes a generally flat flexible strip having a generally flat flexible insulator and wherein said conductive path includes a generally flat wireless conductor on the generally flat flexible insulator and wherein said generally flat flexible strip includes a first connecting pad for connection to the electrode at the receptacle on the electrode casing and a second connecting pad for connection to the output terminal of the shock generator.

21. The electrode device in accordance with claim 20 wherein the first connecting pad includes a recess within the generally flat flexible insulator, the recess exposing the wireless conductor at a bottom of the recess, the first connecting pad having an opening through the bottom of the recess to permit the passage of the electrode therethrough, the recess being dimensioned to receive an electrically conductive washer in electrical contact with the wireless conductor at the bottom of the recess, the washer being seated in the recess and having an opening aligned with the opening in the bottom of the recess to enable the electrode to be inserted into the receptacle, the electrode having a stop portion for limiting insertion of the electrode into the electrode receptacle, the stop portion of the electrode electrically contacting the washer to provide electrical connection between the electrode and the wireless conductor at the first connecting pad.

22. The electrode device in accordance with claim 21 wherein said flat flexible insulator includes a first insulative layer of resinous material and wherein said wireless conductor includes a conductive trace deposited on said first insulative layer.

23. The electrode device in accordance with claim 22 wherein said flat flexible insulator includes a second insulative layer of resinous material over the conductive trace and wherein said recess in the first connecting pad is provided in said second insulative layer.

24. The electrode device in accordance with claim 23 wherein said first layer of resinous material comprises polycarbonate and said second layer of resinous material comprises polyester.

25. An electronic animal control system for use on a collar of an animal for controlling movement of the animal under predetermined conditions comprising:

A. an electric shock generator carried on the collar of the animal, the shock generator having at least one output terminal for producing an electrical shock for output to the animal under the predetermined conditions to control the movement of the animal;
B. an electrode carried on the collar and spaced from the shock generator for engaging the animal to transmit the electrical shock from the output terminal of the shock generator to the animal under the predetermined conditions; and
C. a flexible connector having a flexible insulator and a flexible non-rigid wireless conductive path on the flexible insulator for electrically connecting the output terminal of the shock generator with the electrode, the flexible connector having sufficient length and flexibility to permit movement of the connector during movement of the animal without breaking the conductive path.

26. The electronic animal control system in accordance with claim 25 wherein said electric shock generator includes a second output terminal for producing an electrical shock for output to the animal under the predetermined conditions to control the movement of the animal and wherein said animal control system includes a second electrode carried on the collar and spaced from the shock generator for engaging the animal to transmit the electrical shock from the second output terminal of the shock generator to the animal under the predetermined conditions and a second flexible connector having a flexible insulator and a flexible wireless conductive path on the flexible insulator for electrically connecting the second output terminal of the shock generator with the second electrode, the second flexible connector having sufficient length and flexibility to permit movement of the second flexible connector during movement of the animal without breaking the conductive path on the second flexible connector.

27. The animal control system in accordance with claim 26 wherein said output terminals of said electric shock generator each include an output terminal electrode positioned on the electric shock generator for engaging the animal to transmit the electrical shock to the animal under the predetermined conditions to control the movement of the animal.

28. The electronic animal control system in accordance with claim 25 wherein the flexible connector comprises a generally flat strip and wherein said flexible insulator is generally flat and said wireless conductive path is generally flat.

29. The electronic animal control system in accordance with claim 28 wherein the flexible insulator comprises a resinous material.

30. The electronic animal control system in accordance with claim 29 wherein the resinous material comprises polycarbonate.

31. The electronic animal control system in accordance with claim 29 wherein the resinous material comprises polyester.

32. The electronic animal control system in accordance with claim 28 wherein said wireless conductive path includes a conductive trace provided on said flexible insulator.

33. The electronic animal control system in accordance with claim 28 wherein said flexible insulator includes a first insulative layer and said wireless conductive path includes a conductive trace deposited on said first insulative layer.

34. The electronic animal control system in accordance with claim 33 wherein said flexible insulator includes a second insulative layer over the conductive trace.

35. The electronic animal control system in accordance with claim 34 wherein said first insulative layer includes polycarbonate and said second insulative layer includes polyester.

36. The electronic animal control system in accordance with claim 25 wherein said output terminal of said electric shock generator includes an output terminal electrode positioned on the electric shock generator for engaging the animal to transmit the electrical shock to the animal, and wherein said flexible connector includes a generally flat flexible strip comprising said flexible insulator and said flexible wireless conductive path, said flat flexible strip having a first connecting pad for electrical connection to said electrode spaced from the shock generator and a second connecting pad for electrical connection to the output terminal electrode.

37. The electronic animal control system in accordance with claim 36 wherein the first connecting pad includes a recess exposing the wireless conductive path at a bottom of the recess, the first connecting pad having an opening through the bottom of the recess to permit passage of the electrode spaced from the shock generator therethrough, the recess being dimensioned to receive an electrically conductive washer in electrical contact with the wireless conductive path at the bottom of the recess, the washer being seated in the recess and having an opening aligned with the opening in the bottom of the recess to enable the electrode spaced from the shock generator to be inserted therethrough, the electrode spaced from the shock generator having a stop portion for engaging the washer in electrical contact to provide electrical connection between the electrode spaced from the shock generator and the wireless conductive path at the bottom of the recess in the first connecting pad.

38. The electronic animal control system in accordance with claim 37 wherein the second connecting pad includes a recess exposing the wireless conductive path at the bottom of the recess in the second conducting pad, the second connecting pad having an opening through the bottom of the recess in the second conducting pad to permit the passage of the output terminal electrode therethrough, the recess in the second conducting pad being dimensioned to receive a second electrically-conductive washer in electrical contact with the wireless conductive path at the bottom of the recess in the second conducting pad, the second washer being seated in the recess in the second connecting pad and having an opening aligned with the opening in the bottom of the recess in the second conducting pad to enable the output terminal electrode to be inserted therethrough, the output terminal electrode having a stop portion for engaging the washer in the recess in the second conducting pad in electrical contact to provide electrical connection between the output terminal electrode and the wireless conductive path at the bottom of the recess in the second conducting pad whereby the electrical shock generated at the output terminal of the shock generator is transmitted to the animal at both the output terminal electrode and the electrode spaced from the shock generator.

39. The electronic animal control system in accordance with claim 38 wherein said flexible insulator includes a first insulative layer of resinous material and wherein said wireless conductive path includes a conductive trace deposited on said first insulative layer.

40. The electronic animal control system in accordance with claim 39 wherein the flexible insulator includes a second insulative layer of resinous material over the conductive trace and wherein said recess in the first and second connecting pads is provided in said second insulative layer.

41. The electronic animal control system in accordance with claim 40 wherein said first layer of resinous material comprises polycarbonate and said second layer of resinous material comprises polyester.

42. An electronic animal control system for use on a collar of an animal for controlling movement of the animal under predetermined conditions comprising:
   A. an electric shock generator carried on the collar of the animal, the shock generator having at least one output terminal for producing an electrical shock for output to the animal under the predetermined conditions to control the movement of the animal;
   B. an electrode carried on the collar and spaced from the shock generator for engaging the animal to transmit the electrical shock from the output terminal of the shock generator to the animal under the predetermined conditions; and
   C. a flat flexible connector comprising a generally flat strip having a generally flat flexible insulator and a generally flat flexible wireless conductive path on the flexible insulator for electrically connecting the output terminal of the shock generator with the electrode, said wireless conductive path including a conductive trace provided on the flexible insulator, the flexible connector having sufficient length and flexibility to permit movement of the connector during movement of the animal without breaking the conductive path.

43. An electronic animal control system for use on a collar of an animal for controlling movement of the animal under predetermined conditions comprising:
   A. an electric shock generator carried on the collar of the animal, the shock generator having at least one output terminal for producing an electrical shock for output to the animal under the predetermined conditions to control the movement of the animal;
   B. an electrode carried on the collar and spaced from the shock generator for engaging the animal to transmit the electrical shock from the output terminal of the shock generator to the animal under the predetermined conditions; and
   C. a flexible connector comprising a generally flat strip having a generally flat flexible insulator and a generally flat flexible wireless conductive path on the flexible insulator for electrically connecting the output terminal of the shock generator with the electrode, said generally flat flexible insulator including a first insulative layer and said wireless conductive path including a conductive trace deposited on said first insulative layer, the generally flat flexible connector having sufficient length and flexibility to permit movement of the connector during movement of the animal without breaking the conductive path.

44. The electronic animal control system in accordance with claim 43 wherein said generally flat flexible insulator includes a second insulative layer over the conductive trace.

45. The electronic animal control system in accordance with claim 44 wherein said first insulative layer includes polycarbonate and said second insulative layer includes polyester.

46. An electronic animal control system for use on a collar of an animal for controlling movement of the animal under predetermined conditions comprising:
   A. an electric shock generator carried on the collar of the animal, the shock generator having at least one output terminal for producing an electrical shock for output to the animal under the predetermined conditions to control the movement of the animal, said output terminal including an output terminal electrode positioned on the electric shock generator for engaging the animal to transmit the electrical shock to the animal under the predetermined conditions;
   B. a remote electrode carried on the collar and spaced from the shock generator for engaging the animal to transmit the electrical shock from the output terminal of the shock generator to the animal under the predetermined conditions; and
   C. a flexible connector comprising a generally flat flexible strip having a generally flat flexible insulator and a generally flat flexible wireless conductive path on the flexible insulator for electrically connecting the output terminal of the shock generator with the remote electrode, said flat flexible strip having a first connecting pad for electrical connection to said remote electrode spaced from the shock generator and a second connecting pad for electrical connection to the output terminal electrode, the first connecting pad including a recess exposing the wireless conductive path at a bottom of the recess, the first connecting pad having an opening through the bottom of the recess to permit passage of the remote electrode therethrough, the recess being dimensioned to receive an electrically conductive washer in electrical contact with the wireless conductive path at the bottom of the recess, the washer being seated in the recess and having an opened aligned with the opening in the bottom of the recess to enable the remote electrode to be inserted therethrough, the remote electrode having a stop portion for engaging the washer in electrical contact to provide electrical connection between the remote electrode and the wireless conductive path at the bottom of the recess in the first connecting pad, the flexible connector having sufficient length and flexibility to permit movement of the connector during movement of the animal without breaking the conductive path.

47. The electronic animal control system in accordance with claim 46 wherein the second connecting pad includes a recess exposing the wireless conductive path at the bottom of the recess in the second conducting pad, the second connecting pad having an opening through the bottom of the recess in the second conducting pad to permit the passage of the output terminal electrode therethrough, the recess in the second conducting pad being dimensioned to receive a second electrically-conductive washer in electrical contact with the wireless conductive path at the bottom of the recess in the second conducting pad, the second washer being seated in the recess in the second connecting pad and having an opening aligned with the opening in the bottom of the recess in the second conducting pad to enable the output terminal electrode to be inserted therethrough, the output terminal electrode having a stop portion for engaging the washer in the recess in the second conducting pad in electrical contact to provide electrical connection between the output terminal electrode and the wireless conductive path at the bottom of the recess in the second conducting pad whereby the electrical shock generated at the output terminal of the shock generator is transmitted to the animal at both the output terminal electrode and the remote electrode.

48. The electronic animal control system in accordance with claim 47 wherein said flexible insulator includes a first insulative layer of resinous material and wherein said wireless conductive path includes a conductive trace deposited on said first insulative layer.

49. The electronic animal control system in accordance with claim 48 wherein the flexible insulator includes a second insulative layer of resinous material over the conductive trace and wherein said recess in the first and second connecting pads is provided in said second insulative layer.

50. The electronic animal control system in accordance with claim 49 wherein said first layer of resinous material comprises polycarbonate and said second layer of resinous material comprises polyester.

* * * * *